Figure 1:
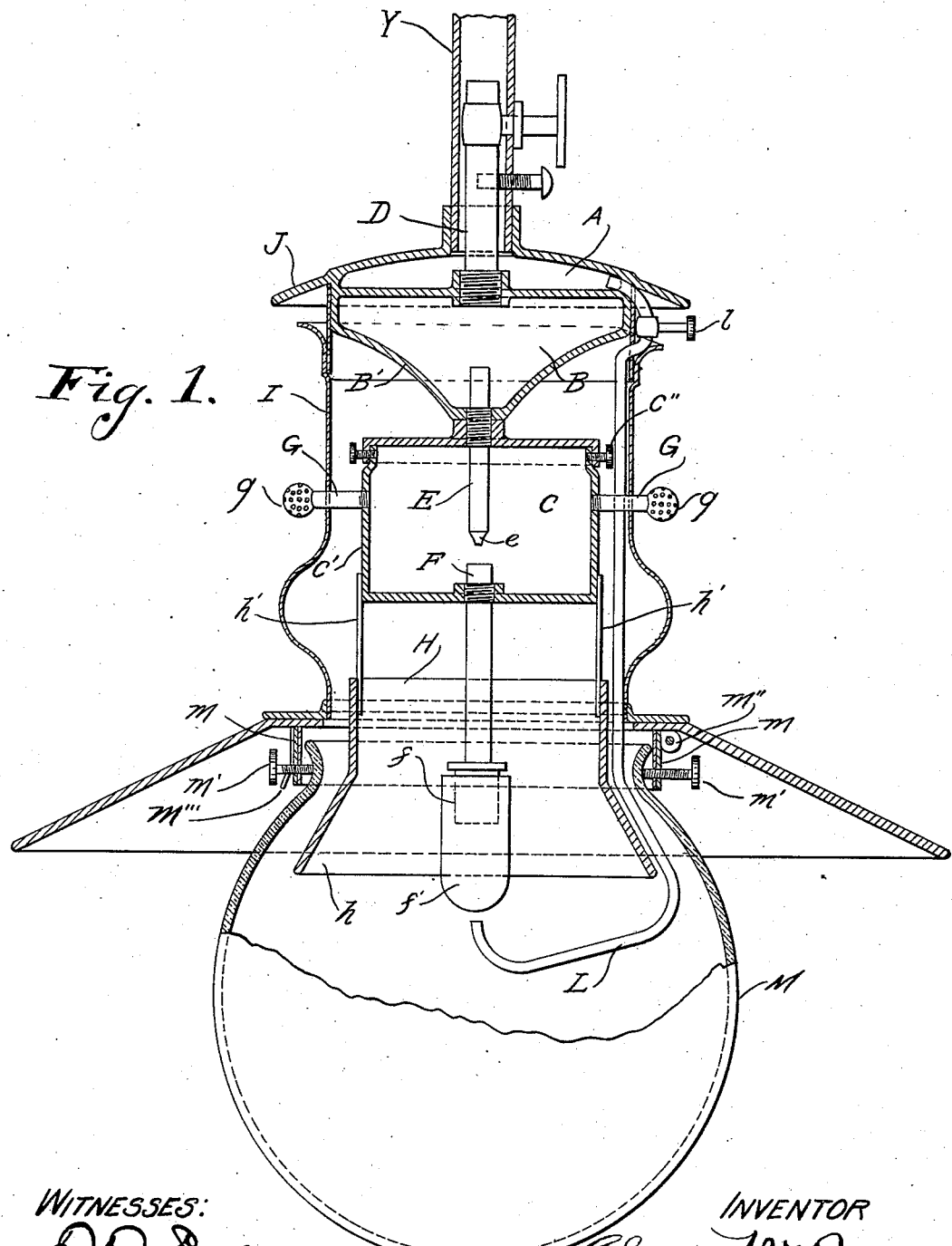

C. W. BOYSE.
GAS LAMP.
APPLICATION FILED AUG. 17, 1908.

928,899.

Patented July 20, 1909.
2 SHEETS—SHEET 1.

WITNESSES:

INVENTOR
Clement W. Boyse,
By Charles Turner Brown
ATTORNEY

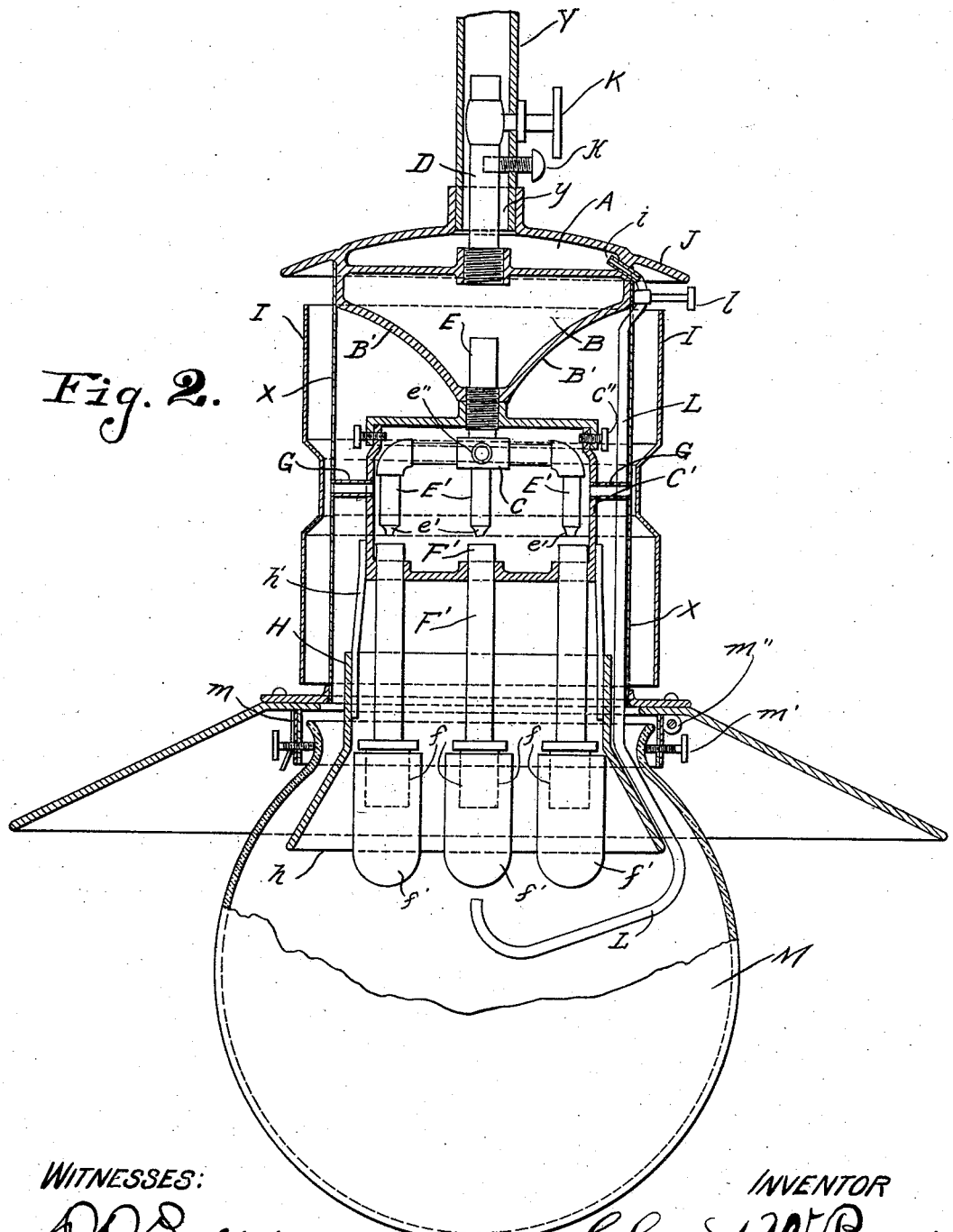

UNITED STATES PATENT OFFICE.

CLEMENT W. BOYSE, OF CHICAGO, ILLINOIS, ASSIGNOR OF ONE-HALF TO DWIGHT B. CARMICHAEL, OF CHICAGO, ILLINOIS.

GAS-LAMP.

No. 928,899.      Specification of Letters Patent.      Patented July 20, 1909.

Application filed August 17, 1908. Serial No. 448,900.

*To all whom it may concern:*

Be it known that I, CLEMENT W. BOYSE, a citizen of the United States, and a resident of Chicago, in the county of Cook and State of Illinois, have invented certain new and useful Improvements in Gas-Lamps, of which the following, when taken in connection with the drawings accompanying and forming a part hereof, is a full and complete specification, sufficient to enable those skilled in the art to which it pertains to understand, make, and use the same.

This invention relates to inverted gas lamp and one of the principal objects of the invention is to obtain an inverted gas lamp which may be burned out of doors as well as within a hall, chamber or other space.

A further object of the invention is to obtain an inverted gas lamp which will be economical in the consumption of gas required to produce a light of a given candle power for a determined length of time.

A further object of the invention is to obtain an inverted gas lamp which will give a steady light of great candle power from a given mantle, and a light not affected by sudden gusts or blasts of air in its vicinity.

Additional objects are disclosed in the devices embodying the invention which are herein illustrated and described.

In the drawings referred to Figure 1 is a vertical section of a device embodying this invention in a construction particularly designed for indoor use, and Fig. 2, is a vertical section of a lamp particularly designed for outdoor use.

In the lamp designed for outdoor use I prefer to use a plurality of burners and mantles; but the essential difference between the indoor and the outdoor lamp, as constructed by me, is simply in the use of an additional perforated cylinder (which is lettered X in Fig. 2) as an element of the wind shield or guard in the outdoor lamp which additional element is not used in the indoor lamp.

A reference letter applied to designate a part is used to indicate such part throughout the several figures of the drawings, wherever the same appears.

In this lamp there are three chambers through which the gas consumed is conveyed before such gas is delivered, mixed with a proper quantity of air to the burner. These chambers are arranged one above the other, the first or upper chamber I term the warming and cleaning chamber (lettered A) the middle one I term the gas heating chamber (lettered B) and the third or lower one, the mixing and super-heating chamber (lettered C).

Y is a gas supply pipe. Pipe Y is arranged to discharge into the chamber A, through the annular space $y$ around pipe D. Pipe D is the outlet from chamber A and the inlet to chamber B. Gas will, for the most part, flow directly through the pipe D, in the operation of the device.

Gas delivered from the supply pipe Y into the chamber A is warmed in such chamber, and when warmed may rise adjacent to pipe D (in space $y$), and enter the pipe D at the upper end thereof, and after flowing through such pipe, be discharged therefrom into the heat-chamber B. Water condensed from the gas flowing through pipe Y will, for the most part cling to the sides of pipe Y, and flowing down the interior of the same, will be conveyed to the chamber. When water is discharged from the supply pipe Y into the chamber A such water is warmed, converted into vapor and delivered from the chamber A to the chamber B (flowing through annular space $y$) along with the gas entering such chamber from pipe D.

E is a passage way communicating at its upper end with chamber B, to form the outlet from such chamber, and at its lower end ($e$) communicating with the chamber C, adjacent to the discharge passage way F from such chamber C. Passage way E is arranged so that gas delivered from end $e$ thereof is directed into the passage way F. Pipe E is branched by tee $e''$, in Fig. 2, to obtain a plurality of passage ways E', E', respectively provided with ends $e'$ where a plurality of discharge passage ways F', F', lead from chamber C with burners $f$, $f$, and mantles $f'$, $f'$, thereon placed in the lamp, (see Fig. 2) and each of the ends $e'$ is directed into its corresponding discharge pipe F'.

G, G, are air inlets to chamber C.

$g$, $g$, are perforated hollow spheres at the receiving end of the several air inlet pipes G, G, which I place on the lamp designed for indoor use, (see Fig. 1), to form a shield for the purpose of preventing a sudden inrush of air to chamber C when, as from the sudden opening or closing of a door or window, a blast or gust is directed against the lamp.

H is a cylinder, open at its ends and provided with the bell $h$ at its lower end, which is secured in a vertical position below chamber C, as by straps $h'$, $h'$, and arranged to collect the heated products of combustion from the burners $f$, $f$, and direct the same onto the casing or shell C' of chamber B from which such heated products flow upward against the casing B' of chamber B over the upper end of cylinder I and from the lamp. Cylinder I is open at its ends, and mounted in a perpendicular position, substantially concentric with cylinder H, and arranged to retain within the lamp the heated products of combustion produced thereby until such heated products are, as before described, directed against the casings C' B' of the several chambers C and B. As the heated products of combustion pass from the lamp (flowing over the upper edge of cylinder I) they pass between such upper edge and the under face of the shade or deflector J. The cylinder serves as a wind shield, also, and the air inlets extend through such cylinder, as shown in the drawings, Fig. 1, with the perforated spheres on the outside thereof.

K is the gas supply cock which controls the admission of gas to chamber B. Chamber A is at all times in communication with the gas supply pipe Y.

$k$ is an adjusting screw arranged to determine the quantity of gas delivered into chamber B when the cock K is open.

In the construction shown the air inlets are unobstructed, and the adjustment of the lamp is made by means of the adjusting screw $k$.

L is the gas supply pipe for the pilot light of the lamp, and is provided with the cock $l$, Pipe L communicates at its upper end with the chamber B, and at its lower end it is arranged to direct a flame against the burners and mantles $f$, $f'$.

In the outdoor construction illustrated in Fig. 1 the perforated cylinder X is within and concentric to the cylinder I, and the air inlet pipes G, G, extend through the walls of such cylinder X and there stop. That is, such air inlet pipes do not extend through the cylinder I, in the outdoor construction. The perforated spheres $g$, $g$ are also not used in the outdoor construction, as the cylinder I serves as the wind shield to the receiving ends of such air inlets.

A plurality of burners may be used in the lamp constructed for indoor use, when desired, and in such case the branches E' and pipes F' are used.

M is a globe held in holder $m$, as by the screws $m'$, $m'$.

$m''$ is a hinge to holder $m$, and $m'''$ is a spring to holder $m$, opposite hinge $m''$.

A strip of sheet asbestos is interposed between the rim of globe M and the holder $m$.

Where a plurality of pipes F' and branches E', E', are contained in chamber G, as illustrated in Fig. 2, the casing C' is made in two parts, the top part being secured to the bottom part, as by screws C''.

The passage way E is preferably through a pipe which is provided with external screw threads in the central part thereof, such screw threads arranged to engage with corresponding screw threads in the top of the casing C'. Passage ways F are illustrated as obtained by the use of pipes, and such pipes are provided with external screw threads arranged to engage with corresponding screw threads in the bottom of the casing C'.

The holder $m$ is attached to the lower end of the cylinder I in the indoor lamp, and to the lower end of cylinder X in the outdoor lamp.

The operation of the device is,—Gas is delivered from the gas supply pipe Y to the chamber A and (through pipe D) to chamber B, and water may be deposited from the gas in chamber A. Water deposited in chamber A is vaporized and then delivered from such chamber into chamber B along with gas delivered into such chamber. Gas, as well as water, in chamber A is warmed; and gas in chamber B is heated before it is delivered therefrom into the passage way E. Gas delivered from the ends $e$, (or $e'$, $e'$) is directed into the passage ways F, (or F') and while such gas passes through the intervening space in chamber C which is between such end $e$ and the inlet of passage way F it induces a current of air from the chamber C to also flow from chamber C into the passage way F. Air to supply the air flowing into the passage way F (or F', F'), from the chamber C is supplied to such chamber through the passage ways G, G. Air in chamber C is highly heated by the products of combustion which are directed thereonto by the cylinder H; and the mixed gas and air in passage ways F and F' are in a highly heated condition before delivery thereof to the burner $f$ at the lower end of such pipe. The flame produced by the burner $f$ is an ordinary blue flame, but causes intense heat, and the mantle $f'$ is put into incandescent condition giving bright light therefrom.

Having thus described my invention and the construction of a lamp embodying the same, what I claim as new and desire to secure by Letters Patent is;—

1. In an inverted gas lamp, the combination of a casing provided with a plurality of chambers with a gas supply pipe arranged to discharge its contents into the upper one of the chambers, such casing provided with a passage way arranged to communicate with the upper and middle chambers above the respective floors thereof, and provided with an additional passage way arranged to communicate with the middle and lower chambers above the respective floors thereof, means to supply air to the lower chamber, a burner, and a combined air and gas passage way from the lower chamber to the burner, the passage way from the middle to the lower chamber arranged to direct fluid flowing therethrough into the combined air and gas passage way from the lower chamber and means to direct the products of combustion from the burner into the casing to separately heat the fluids in the chambers thereof before the same are delivered to the air and gas passage way; substantially as described.

2. In an inverted gas lamp, a casing provided with a plurality of chambers in combination with a gas supply pipe arranged to deliver fluids into the upper one of the chambers, and a gas burner, such casing provided with a passage way arranged to communicate with the upper and middle chambers above the respective floors thereof, and provided with an additional passage way arranged to communicate with the middle and lower chamber above the respective floors thereof, passage ways arranged to supply air to the lower chamber, shields to the receiving ends of the air passage ways, and a combined air and gas passage way from the lower chamber to the burner, the passage way from the middle to the lower chamber arranged to direct fluid flowing therethrough into the combined air and gas passage ways from the lower chamber and a cylinder arranged to collect and direct the products of combustion from the burner onto the casing to separately heat the contents thereof before the same are delivered to the air and gas passage way, substantially as described.

3. In an inverted gas lamp, a casing provided with a plurality of chambers, in combination with a gas supply pipe arranged to deliver fluids into the upper one of the chambers, and a gas burner, such casing provided with a passage way arranged to communicate with the upper and middle chambers above the respective floors thereof, and provided with an additional passage way arranged to communicate with the middle and lower chambers above the respective floors thereof, passage ways arranged to supply air to the lower chamber, a cylinder open at the ends and arranged to form a shield to the receiving ends of the air passage ways, a combined air and gas passage way from the lower chamber to the burner, the passage way from the middle to the lower chamber arranged to direct fluid flowing therethrough into the combined air and gas passage ways from the lower chamber, and a cylinder arranged to collect and direct the products of combustion from the burner on to the casing and separately heat the contents thereof before such contents are delivered to the combined air and gas passage way, a globe and means to attach the globe to the lamp, substantially as described.

4. In an inverted gas burner, a chamber provided with a gas inlet and with air inlets, and provided with a combined air and gas outlet, means to deliver gas into the chamber through the gas inlet and to direct such gas into the combined air and gas outlet, means to heat the gas prior to the delivery thereof into the chamber, such air inlets arranged to direct the air delivered therefrom across the gas flowing through the chamber, a burner tube and a burner, such burner tube directly connected to the chamber and projecting into such chamber above the floor thereof, and arranged so that the heated products of combustion flow directly against and around the walls of the chamber, and such outlet arranged to deliver air and gas to the burner; substantially as described.

CLEMENT W. BOYSE.

In the presence of—
CHARLES TURNER BROWN,
DWIGHT B. CARMICHAEL.